(12) United States Patent
Sato

(10) Patent No.: US 7,010,023 B1
(45) Date of Patent: Mar. 7, 2006

(54) PATH SEARCH CIRCUIT FOR SIMULTANEOUSLY PERFORMING ANTENNA DIRECTIVITY CONTROL AND PATH SEARCH

(75) Inventor: Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 763 days.

(21) Appl. No.: 09/614,592

(22) Filed: Jul. 12, 2000

(30) Foreign Application Priority Data

Jul. 16, 1999 (JP) ................................. 11-203752

(51) Int. Cl.
 *H04B 1/707* (2006.01)
(52) U.S. Cl. ...................... 375/150; 375/343; 375/347; 370/342
(58) Field of Classification Search ................ 375/130, 375/140, 142, 143, 144, 147, 148, 150, 152, 375/260, 267, 285, 343, 347; 370/320, 335, 370/342
See application file for complete search history.

(56) References Cited

U.S. PATENT DOCUMENTS

| | | | | |
|---|---|---|---|---|
| 5,730,272 A | * | 3/1998 | Dobbins et al. | ............. 194/317 |
| 5,812,593 A | * | 9/1998 | Kaku | ........................... 375/150 |
| 5,982,763 A | * | 11/1999 | Sato | ........................... 370/342 |
| 6,064,695 A | * | 5/2000 | Raphaeli | ..................... 375/230 |
| 6,069,912 A | * | 5/2000 | Sawahashi et al. | ......... 375/142 |
| 6,087,986 A | * | 7/2000 | Shoki et al. | ................ 342/383 |
| 6,128,333 A | * | 10/2000 | Kinoshita et al. | ........... 375/147 |
| 6,205,166 B1 | * | 3/2001 | Maruta et al. | .............. 375/130 |
| 6,272,167 B1 | * | 8/2001 | Ono | ............................. 375/144 |
| 6,498,804 B1 | * | 12/2002 | Ide et al. | ..................... 375/144 |

FOREIGN PATENT DOCUMENTS

| | | |
|---|---|---|
| CA | 2 211 619 C | 6/1997 |
| EP | 0 806 844 A1 | 11/1997 |
| JP | 9-74372 | 3/1997 |
| JP | 10-32523 | 2/1998 |
| JP | 10-93323 | 4/1998 |
| JP | 11-55216 | 2/1999 |

OTHER PUBLICATIONS

Thomas T A et al: "Novel Receiver Space-Time Processing For Interference Cancellation and Equalization in Narrowband TDMA Communication", Vehicular Technology Conference, 1997, IEEE 47$^{th}$ Phoenix, AZ, USA May 4-7, 1997, New York, NY, USA, IEEE, US, May 4, 1997, pp. 160-164, XP010228770.

Thompson J S et al: "Smart-Antenna Arrays For CDMA Systems", IEEE Personal Communications, IEEE Communications Society, US, vol. 3, No. 5, Oct. 1, 1996, pp. 16-25, XP000635696.

* cited by examiner

*Primary Examiner*—Chieh M. Fan
(74) *Attorney, Agent, or Firm*—Sughrue Mion, PLLC

(57) ABSTRACT

A path search circuit simultaneously performs antenna directivity control and a path search. A weighting controller controls weighting coefficients to establish an antenna directivity in a plurality of directions in which a party to communicate with is possibly present, when a communication session starts. A weighted-mean-value processor calculates delay profiles for the respective antenna directivities. A correlation peak detector detects a peak from the calculated delay profiles for thereby carrying out general antenna directivity control and a path search. At the time of starting the communication session when the direction of a mobile terminal is unknown, a path search can be conducted using a signal with a Eb/Io increased by an antenna gain for increased path search accuracy.

17 Claims, 4 Drawing Sheets

PATH SEARCH CIRCUIT FOR SIMULTANEOUSLY PERFORMING ANTENNA DIRECTIVITY CONTROL AND PATH SEARCH

BACKGROUND OF THE INVENTION

1. Field of the Invention

The present invention relates to an automobile telephone/portable telephone system (cellular system) based on direct sequence—code division multiple access (DS-CDMA) principles, and more particularly to a path search (path timing detection) circuit for use in a base station apparatus having an adaptive array antenna.

2. Description of the Related Art

One conventional path search circuit is disclosed in Japanese laid-open patent publication No. 10-32523 entitled "Reception timing detecting circuit for CDMA receiver". The disclosed reception timing detecting circuit detects reception timing according to the following procedure:

(1) A cross correlation signal indicative of a cross correlation between a signal sequence in which a known pilot symbol sequence is spread and a received signal is determined.

(2) In order to increase the accuracy of detection of reception timing without increasing the amount of calculations for determining the correlation, the cross correlation signal is interpolated to obtain a cross correlation signal having a short sampling period.

(3) The power of the cross correlation signal is determined.

(4) The power of the cross correlation signal is averaged over a given period of time.

(5) A peak of the averaged power of the cross correlation signal is detected, and the timing of the detected peak is regarded as the reception timing of the CDMA receiver.

For determining a cross correlation signal, a received signal and a sequence in which a pilot symbol sequence is spread may be stored in a memory and read therefrom a plurality of times that are shifted from each other thereby to determine cross correlation values (cross correlation signals) with shifted delays.

According to the above conventional reception timing detecting circuit, it is possible to perform stable detection of reception timing (path search) even if the ratio (Eb/Io) of signal energy (Eb) per bit to interference power (Io) per Hz. Furthermore, the interpolation of the cross correlation signal allows highly accurate reception timing to be calculated without increasing the amount of calculations for determining the correlation.

One application of the present invention is in the art of Wideband Code Division Multiple Access (W-CDMA) for the third-generation mobile communication system. While the W-CDMA technology has not yet been put to practical use, efforts are being made to standardize its radio interface. See Specifications of Air-Interface for 3G Mobile Systems, Volume 3, Ver. 1.0 (–1.2), ARIB. According to the W-CDMA technology, known pilot symbols are added to an individual channel for each mobile terminal. Since the pilot symbols and a spreading code sequence are known by a receiver, they can be used as a known signal sequence for a correlation processor in carrying out a path search.

The W-CDMA technology is based on the assumption that an adaptive array antenna or smart antenna will be introduced in order to increase the capacity of communications in the future. The adaptive array antenna comprises a plurality of antenna elements arranged at a constant interval, e.g., one half of the wavelength, and the amplitude and phase of signals transmitted and received by each of the antenna elements are controlled to establish an antenna directivity optimum for the mobile terminal with which to communicate, for thereby reducing multiple access interference (MAI) at the same frequency. The adaptive array antenna or smart antenna is described in "Smart Antenna Arrays for CDMA systems", IEEE Personal Communications, Vol. 3, No. 5, for example.

The conventional path search circuit described above is not assumed to be applicable to a radio base station apparatus using an adaptive array antenna, and performs independent processing per antenna (element). Therefore, while the conventional path search circuit is capable of effecting a normal path search if applied to a radio base station apparatus using an antenna which comprises one element, it suffers problems if applied to a radio base station apparatus using an adaptive array antenna.

More specifically, if the path search circuit is controlled so that the Eb/Io of a signal after it has obtained a directivity gain has a required quality as in a CDMA cellular system using an adaptive array antenna, then the Eb/Io per antenna element is of a value much lower than the Eb/Io having the required quality. Therefore, the path search circuit finds it difficult to perform a path search.

If an adaptive array antenna has Na elements, then the Eb/Io after the Na elements have been combined is ideally Na times the Eb/Io of each element. Therefore, if the transmitted power is controlled in a quick period of 0.625 ms so as to enable a receiver to obtain a necessary and sufficient Eb/Io as in the W-CDMA system, then a path search has to be carried out with the Eb/Io per antenna element being 1/Na as compared with the case where no adaptive array antenna is used.

A specific numerical example will be described below. If the number Na of antenna elements is Na=8 and the Eb/Io after the antenna elements are combined is Eb/Io=5 dB, then since the Eb/Io per antenna element is ideally ⅛ (–9 dB) of the Eb/Io after the 8 antenna elements are combined, the path search circuit needs to operate with the Eb/Io=–4 dB per antenna element. If the Eb/Io after the 8 antenna elements are combined is the same as the conventional Eb/Io with no adaptive array antenna used, i.e., if the reception quality is the same as the conventional reception quality, then the path search is required to be performed with a Eb/Io that is 9 dB lower than the conventional Eb/Io. Therefore, the conventional path search circuit fails to achieve a sufficient reception quality. Furthermore, if there are four paths having the same level, then the Eb/Io per path is Eb/Io=–10 dB, which is a very strict condition to satisfy, making it difficult for the conventional path search circuit to detect a path with sufficient accuracy.

The CDMA system cannot receive a signal unless it detects proper path timing. If a path search is conducted using a signal after the directivity of an adaptive array antenna is established, i.e., after received signals from respective antenna elements are multiplied by a suitable weighting coefficient and added together, then a signal having the same Eb/Io as the conventional Eb/Io may be used to carry out the path search. The path search and the appropriate antenna directivity depend on each other in that if the path search is not carried out properly, no signal can be received, and hence the appropriate antenna directivity cannot be established, and if the appropriate antenna directivity cannot be established, then no proper path can be detected. Consequently, once path timing or antenna directivity loses a proper value due to some disturbances, no normal reception condition can subsequently be regained autonomously.

SUMMARY OF THE INVENTION

It is therefore an object of the present invention to provide a path search circuit capable of performing a stable path search even if applied to a radio base station apparatus using an adaptive array antenna, i.e., a smart antenna.

In order to achieve the above object, there is provided a path search circuit comprising an antenna having a plurality of elements, a plurality of radio receivers, a plurality of A/D converters, a plurality of correlation processors, a weighted-mean-value processor, a correlation peak detector, and a weighting controller.

The radio receivers frequency-convert radio frequency signals received respectively by the elements of the antenna into respective baseband signals. The A/D converters convert the respective baseband signals into digital data. The correlation processors calculate cross correlations between the digital data converted from the baseband signals and a signal known at a reception side, and output respective correlation signals. The weighted-mean-value processor weights and adds the correlation signals output from the correlation processors based on indicated weighting coefficients, and averages the weighted and added correlation signals for a predetermined number of times. The correlation peak detector detects at least one peak from the weighted and averaged correlation signals output as delay profiles from the weighted-mean-value processor, and outputs a reception level and reception timing corresponding to the detected peak as a reception level and reception timing of a reception path. The weighting controller controls the weighting coefficients to determine a directivity of the antenna and generates a plurality of weighting coefficients to establish a plurality of general antenna directivities for dividing a sector where a mobile terminal with which to communicate is present, when a communication session starts.

With the above arrangement, the weighting controller controls weighting coefficients to establish an antenna directivity in a plurality of directions in which a party to communicate with is possibly present, when a communication session starts. The weighted-mean-value processor calculates delay profiles for the respective antenna directivities. The correlation peak detector detects a peak from the calculated delay profiles for thereby carrying out general antenna directivity control and a path search. At the time of starting the communication session when the direction of a mobile terminal is unknown, a path search can be conducted using a signal with a Eb/Io increased by an antenna gain for increased path search accuracy.

Since the antenna directivity control and the path search are simultaneously carried out, an element of instability heretofore experienced, i.e., a condition in which if the antenna directivity is lost, then the path search is disabled and no signals can be received, with the result that the antenna directivity cannot autonomously be recovered, can be eliminated.

The above processing can be performed without increasing the amount of correlation calculations that is the greatest among other calculations in carrying out a path search. Since weighting calculations for the respective antenna elements may be effected on a relatively small sampled number of correlation signals, any increase in the amount of calculations is small even if delay profiles corresponding to a plurality of antenna directivities are simultaneously determined.

The weighted-mean-value processor comprises a first memory, a plurality of second memories, and a processing means.

The first memory temporarily stores the correlation signals output from the correlation processors. As many second memories as the number of antenna directivities to be established store interim calculated results of the weighted and added correlation signals for the respective antenna directivities. The processing means multiplies the correlation signals read from the first memory by the weighting coefficients indicated by the weighting controller, adds the multiplied correlation signals into a sum signal, determines the power of the sum signal, updates the interim calculated results stored in the second memories based on the determined power, averages the updated interim calculated results for a predetermined number of times to obtain weighted means of correlation values, and outputs the obtained weighted means as delay profiles.

The weighted-mean-value processor may further comprise an interpolation filter for sampling again the weighted correlation signals at a frequency higher than a sampling frequency of the A/D converter to increase a sampling rate.

By passing the weighted correlation signals through the interpolation filter, it is possible to obtain correlation signals that have been sampled again with an arbitrary accuracy for thereby increasing the accuracy of a delay time.

The weighting controller may comprise means for generating combinations of weighting coefficients for establishing an antenna directivity in a plurality of directions in which a party to communicate with is possibly present, when the communication session starts, and reducing the number of combinations to be generated during the communication session so as to be smaller than the number of combinations to be generated when the communication session starts.

The weighted-mean-value processor may further comprise means for averaging the power of the correlation signals according to a moving average method or a method of generating an exponentially weighted mean in time with forgetting coefficients.

The above and other objects, features, and advantages of the present invention will become apparent from the following description with reference to the accompanying drawings which illustrate examples of the present invention.

DETAILED DESCRIPTION OF THE PREFERRED EMBODIMENTS

1st Embodiment

Figure 1:
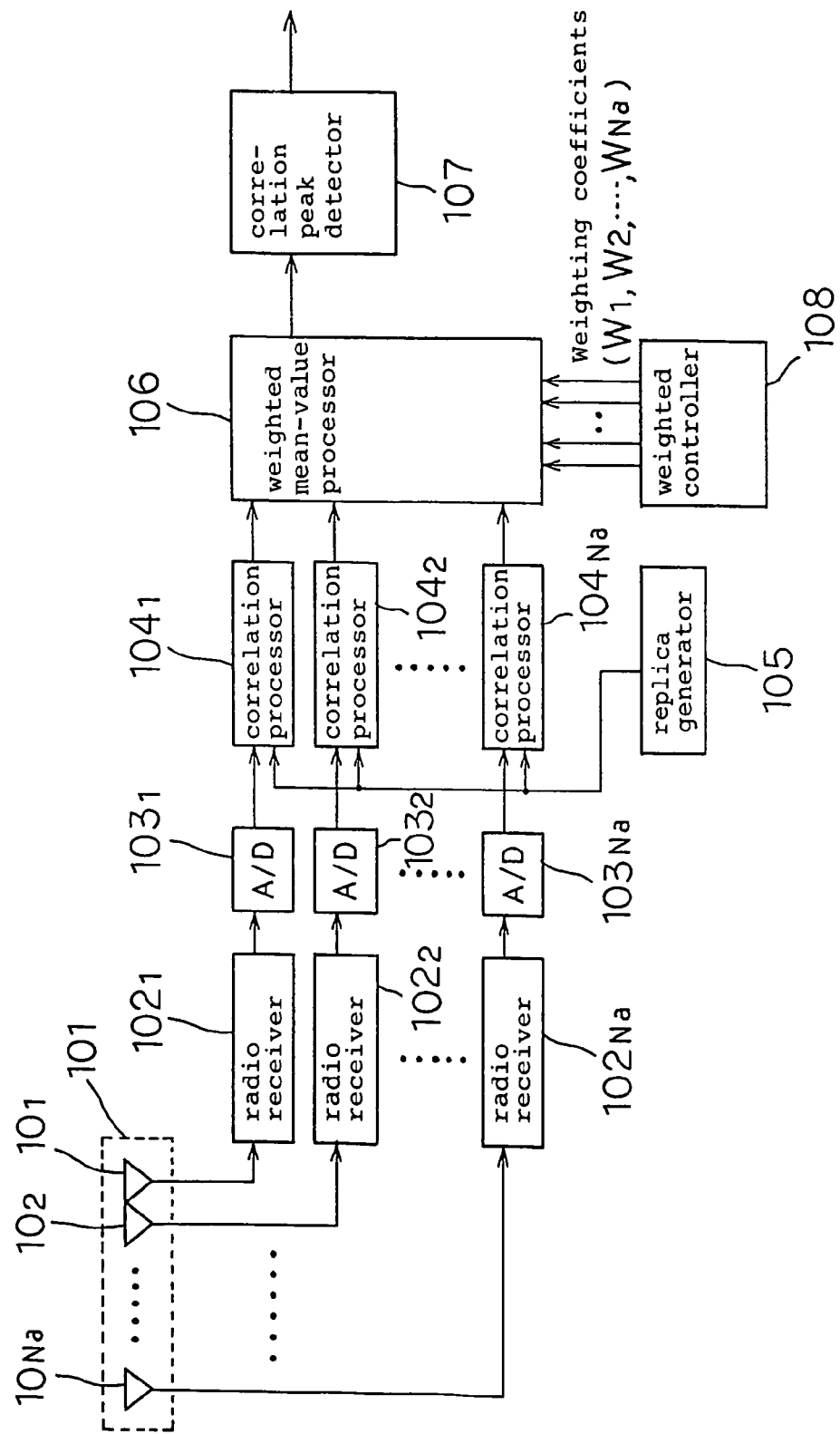
FIG. 1 is a block diagram of a path search circuit according to a first embodiment of the present invention.

Referring now to FIG. 1, there is shown a path search circuit according to a first embodiment of the present invention which comprises an array antenna 101 having Na antenna elements $10_1-10_{Na}$ that are arranged as a linear array at half wavelength intervals, Na radio receivers $102_1-102_{Na}$ connected respectively to the antenna elements $10_1-10_{Na}$, Na A/D converters $103_1-103_{Na}$ connected respectively to the radio receivers $102_1-102_{Na}$, a replica generator 105, Na correlation processors $104_1-104_{Na}$ connected respectively to the A/D converters $103_1-103_{Na}$ and the replica generator 105, a weighted-mean-value processor 106 connected to the correlation processors $104_1-104_{Na}$, a correlation peak detector 107 connected to the weighted-mean-value processor 106, and a weighting controller 108 connected to the weighted-mean-value processor 106.

The A/D converters $103_1-103_{Na}$ converts received signals supplied from the radio receivers $102_1-102_{Na}$ into digital data. The replica generator 105 generates a replica of a known signal sequence contained in the received signals, e.g., a sequence in which pilot symbols in a W-CDMA system are spread.

The correlation processors $104_1-104_{Na}$ calculates correlations (complex number values) between the replica signal generated by the replica generator 105 and the digital data generated by the A/D converters $103_1-103_{Na}$, and outputs the calculated correlations as Na correlation signals. The weighted-mean-value processor 106 weights the Na correlation signals output from the correlation processors $104_1-104_{Na}$ based on weighting coefficients indicated by the weighting controller 108, and adds the weighted correlation signals to each other, and averages the weighted and added signal over a given period of time.

A specific arrangement of the weighted-mean-value processor 106 will be described below with reference to FIG. 2.

Figure 2:
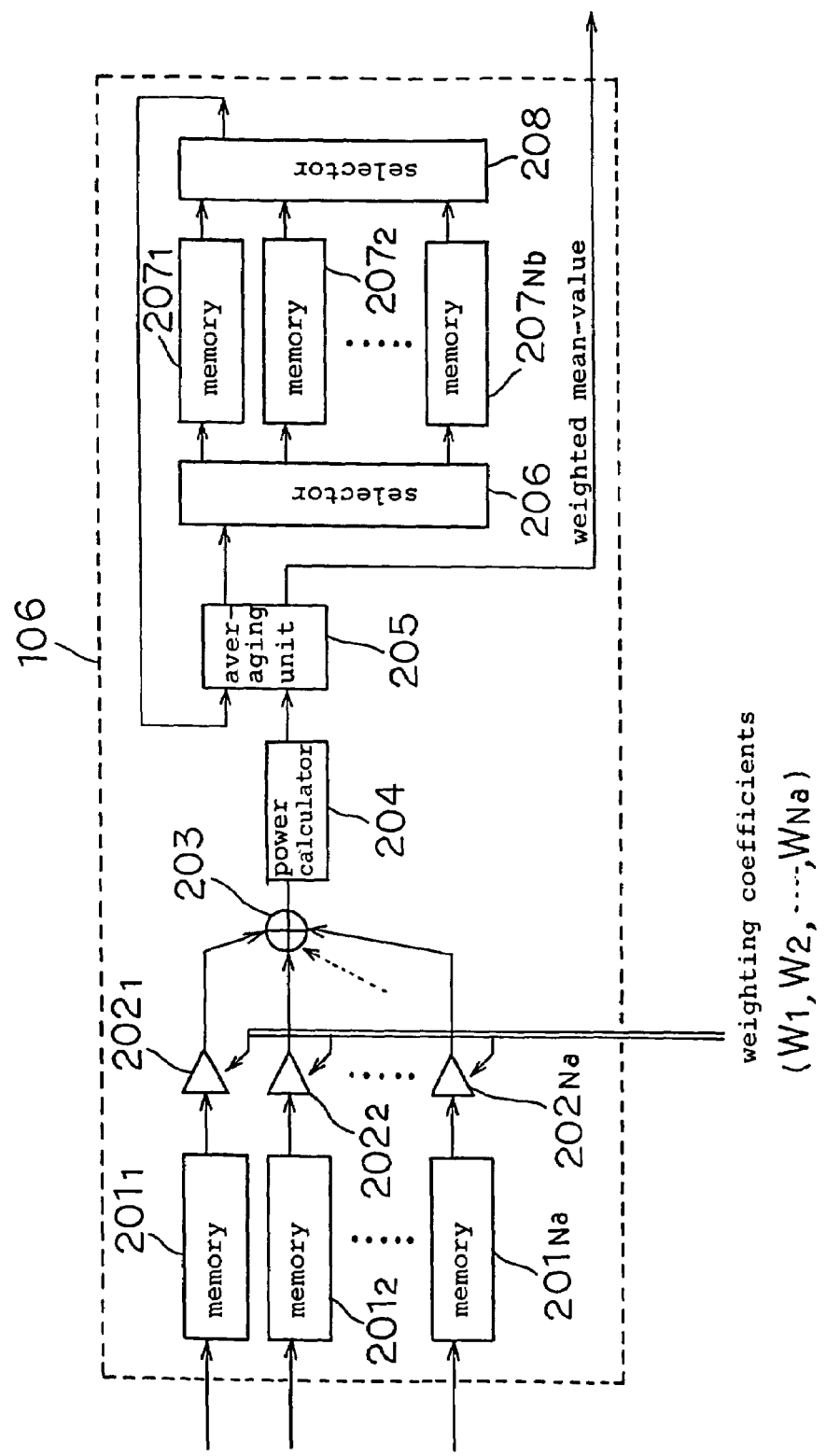
FIG. 2 is a block diagram of a weighted-mean-value processor in the path search circuit shown in FIG. 1.

As shown in FIG. 2, the weighted-mean-value processor 106 comprises memories $201_1-201_{Na}$, multipliers $202_1-202_{Na}$, an adder 203, a power calculator 204, an averaging unit 205, a selector 206, memories $207_1-207_{Na}$, and a selector 208.

The memories $201_1-201_{Na}$, which have as many blocks as the number Na of antenna elements, store the Na correlations calculated by the correlation processors $104_1-104_{Na}$. The multipliers $202_1-202_{Na}$ multiply the correlations read from the memories $201_1-201_{Na}$ by respective weighting coefficients $W_1, W_2, \ldots, W_{Na}$ indicated by the weighting controller 108. The adder 203 adds the weighted Na correlations to each other.

The power calculator 204 calculates the power of the sum signal output from the adder 203, i.e., the sum of squares of real and imaginary parts of the sum signal output from the adder 203. The memories $207_1-207_{Na}$, which have as many blocks as the number Nb of antenna directivities, store interim calculated results of delay profiles. The selectors 206, 208 select the writing of data into the memories $207_1-207_{Na}$ and the reading of data from the memories $207_1-207_{Na}$, respectively. The averaging unit 205 averages the delay profiles over a given period of time.

The multipliers $202_1-202_{Na}$, the adder 203, the power calculator 204, the averaging unit 205, and the selectors 206, 207 jointly make up a processing circuit.

The correlation peak detector 107 detects a plurality of peaks from the weighted and averaged correlation signal which corresponds to the delay profile for each antenna directivity, and outputs reception levels and reception timing corresponding to the detected peaks as reception levels and reception timing of reception paths.

The weighting controller 108 controls the weighting coefficients $W_1, W_2, \ldots, W_{Na}$ to be set in the weighted-mean-value processor 106 for thereby controlling the directivity of the antenna 101. At the start of communications, the weighting controller 108 generates a plurality of weighting coefficients $W_1, W_2, \ldots, W_{Na}$ to form a plurality of general antenna directivities for dividing a sector where a mobile terminal with which to communicate is present, and supplies the generated weighting coefficients $W_1, W_2, \ldots, W_{Na}$ to the weighted-mean-value processor 106.

Figure 3:
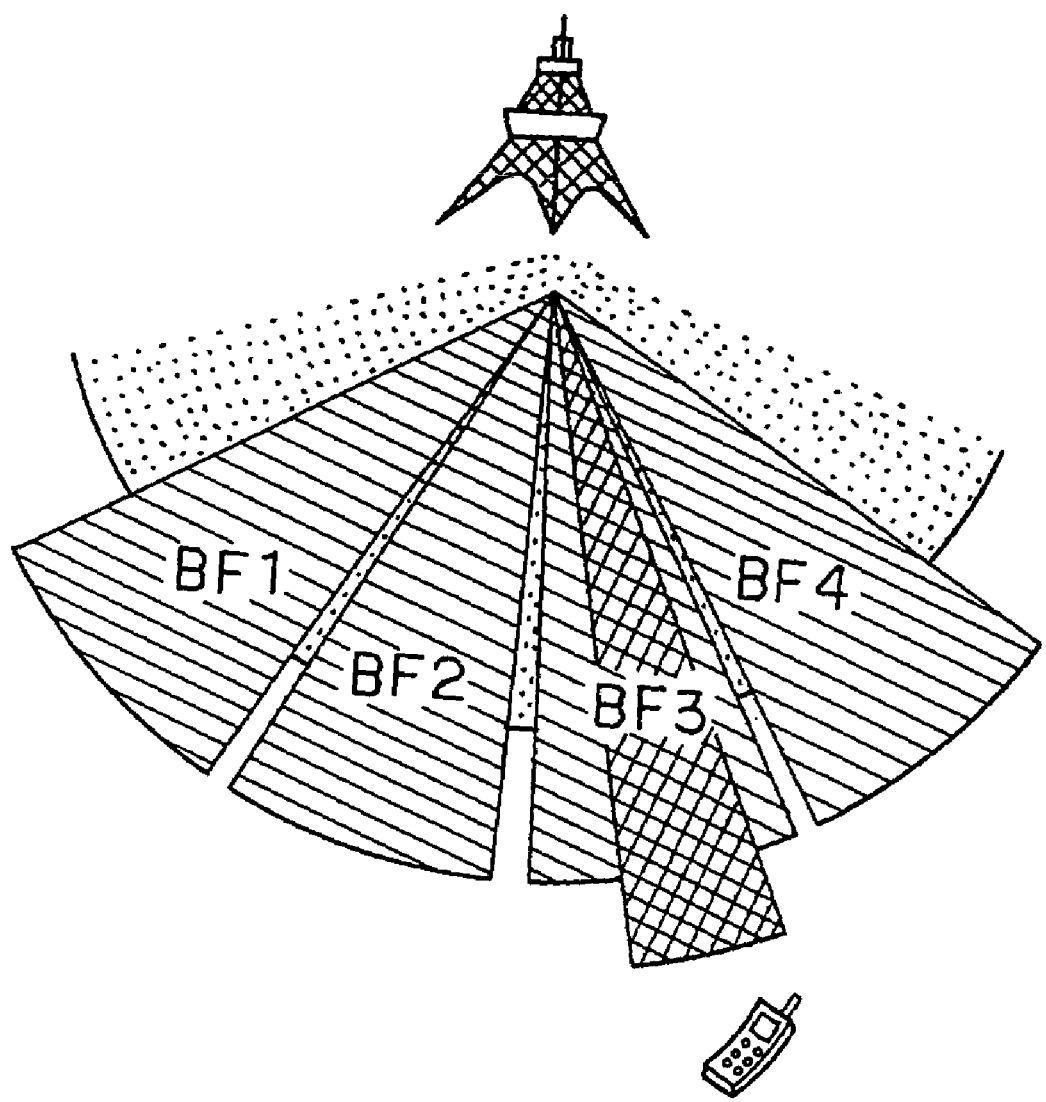
FIG. 3 is a diagram illustrative of the principles of operation of the path search circuit shown in FIG. 1.

The principles of operation of the path search circuit according to the first embodiment will be described below with reference to FIG. 3. FIG. 3 shows a cellular system where one cell is divided into three sectors each having an angular extent of 120 degrees. It is assumed that the base station is aware of the sector where a mobile terminal with which to communicate is present, but does not know the whereabouts of the mobile terminal in the sector.

The base station successively forms four antenna directivities BF1–BF4 which divide and covers the sector where the mobile terminal with which to communicate is present, calculates delay profiles for the respective antenna directivities BF1–BF4, and detects peaks of the obtained delay profiles, for thereby simultaneously determining which of the antenna directivities BF1–BF4 the mobile terminal is located in and detecting path timing. Since one sector is divided by four antenna directivities, i.e., beams, in this example, an antenna gain of about 6 dB can be expected. The weighting controller 108 sets the combination of calculated weighting coefficients $W_1, W_2, \ldots, W_{Na}$ in the multipliers $202_1-202_{Na}$ of the weighted-mean-value processor 106 for thereby forming the antenna directivities BF1–BF4.

The path search circuit according to the first embodiment forms a plurality of delay profiles for limiting the directivity to a plurality of directions where the mobile terminal with which to communicate is possibly present, and then detects peaks from the delay profiles for simultaneously roughly determining the direction of the mobile terminal and detecting path timing. Since the path search circuit generates delay profiles after having limiting the antenna directivity, it can calculate delay profiles at a higher Eb/Io than the Eb/Io of the signal per element.

However, when four antenna beams are generated and a delay profile is calculated with respect to each combined signal, as shown in FIG. 3, the amount of calculations required is very large. This is because if a path search is carried out with received signals after antenna directivities are formed, then weighing and adding calculations need to be carried out at a clock rate that is twice the chip rate or higher, resulting in the need for a considerably large amount of calculations.

For conducting a path search with received signals after antenna directivities are formed, if it is assumed that a W-CDMA system is employed, a chip rate=4 MHz, pilot symbols=6 symbols×256 chips=1536 chips, the number Na of antenna element=8, a path search range L=128 chips (reciprocal propagation delay=31 microseconds, radius=about 4.7 km), and the accuracy of calculations of a delay profile=1/8 chip, then the number of calculations per slot is given as follows:

(1) Calculations for generating a combines signal for one beam: 1536×8×Na complex product and sum calculations.

(2) Calculations of delay profiles per beam: 1536×128×8=1,572,864 correlation calculations.

For four beams, calculations four times the above calculations need to be repeated per slot=0.625 ms. No multiplications are required in the correlation calculations because the replica signal is a code signal having no amplitude.

It follows from the foregoing example that about 630M complex product and sum calculations per second and about 10G correlation calculations per second are necessary. However, this amount of calculations is huge and not realistic.

The path search circuit according to the first embodiment performs a smaller amount of calculations to achieve results that are equivalent to those of the above process.

Operation of various circuit elements in the first embodiment will be described in detail below.

In FIG. 1, signals received by the elements $10_1$–$10_{Na}$ of the antenna 101 are frequency-converted into baseband signals, which are then converted into digital signals. In the W-CDMA system, since the chip rate is 4 MHz and the amplitude range is 5 MHz (one side of the range is 2.5 MHz), if the received signals are sampled at a clock frequency of 5 MHz or higher, the information represented by the received signals can fully be retained according to the Nyquist's sampling theorem. It is assumed that the received signals are sampled at 8 MHz which is twice the chip rate because the sampling frequency would not be easily handled unless it is an integral multiple of the chip rate. The baseband signals are expressed by a complex number in order to handle passband signals as equivalent baseband signals. Specifically, the baseband signals are expressed by a complex number whose real part represents an in-phase component (I component) and imaginary part represents a quadrature component (Q component).

The replica generator 105 is a means for generating a known signal sequence in a receiving base station. In the W-CDMA system, the replica generator 105 generates a pilot symbol sequence. The correlation processors $104_1$–$104_{Na}$ calculate a cross correlation between the complex baseband digital signals equivalent to the signals received by the respective antenna elements and the replica of the pilot symbols.

If the number of an antenna element is represented by n (n=1–Na), the chip number by t (t=1–Nc), the lag by l (l=0–2L–1), the signal received by the antenna element n by Rn(2t+i), i=0, 1, and the pilot replica signal by P(t), then the cross correlation signal Xn of the antenna element n is expressed by the following equation (1):

$$Xn(1) = \sum_{t=1}^{Nc} Rn(2t+1) \times \overline{P(t)} \quad (1)$$

where P(t) with an overbar represents a complex conjugate signal of P(t).

Since the mobile terminal transmits an upstream signal (from the mobile terminal to the base station) in synchronism with a downstream signal (from the base station to the mobile terminal), the reception timing at the base station delays from the transmission timing of the downstream signal by a reciprocal propagation delay between the base station and the mobile terminal. Consequently, the base station may search reception paths in a certain delay range determined from the radius of the service area. If the path search range is 128 chips, then the reciprocal propagation delay is 31 microseconds, and the service area radius is about 4.7 km. The cross correlation may be calculated up to L=128 chips at maximum.

Operation of the weighted-mean-value processor 106 will be described below. A weighted correlation signal $XW_k(1)$ corresponding to the antenna directivity k (k=1– Nb) is expressed by the following equation (2):

$$XW_k(1) = \sum_{n=1}^{Na} W_{k,n} \times X_n(1) \quad (2)$$

where $W_{k,n}$ (n=1, . . . , Na, k=1, . . . , Nb) represents a weighting coefficient corresponding to the antenna directivity k.

The Na correction signals (complex signals) for the respective antenna elements are used a plurality of times for calculating the delay profiles of a plurality of antenna directivities, the Na correlation signals are temporarily stored in the memories $201_1$–$201_{Na}$. After the stored Na correlation signals are read from the memories $201_1$–$201_{Na}$, they are multiplied by weighting coefficients indicated by the weighting controller 108 by the multipliers $202_1$–$202_{Na}$, and then added to each other by the adder 203. The sum signal produced by the adder 203 is converted into a power value by the power calculator 204. Since the correlation signals are complex signals, the power can be calculated by calculating the sum of the squares of the real and imaginary parts of the correlation signals.

The memories $207_1$–$207_{Nb}$ for storing interim calculated results are initially cleared to zero, and then controlled by the selectors 206, 208 to add a correlation power value calculated in each slot and read interim calculated results to each other, and store again updated interim calculated results.

The above calculations are repeated as many times as the number Nb of antenna directivity patterns during one slot, thus updating Nb correlation signals (delay profiles). Since the signal to noise power ratio for correlation signals during one slot is small, resulting in a high probability to detect peaks in error, correlation signals are averaged over a given period of time until the probability to detect correct peaks becomes sufficiently high, whereupon delay profiles corresponding to a plurality of antenna directivities are output. As the averaging time increases, the signal to noise power ratio increases, improving the ability to detect correct peaks, but a time delay occurs until the peaks are detected. Particularly, while the mobile terminal is moving at a high speed, a change in the propagation during the averaging process cannot be ignored. For ordinary mobile communications, therefore, the averaging time is limited to about 50 ms to 100 ms.

The correlation peak detector 107 detects peaks from delay profiles corresponding to the Nb antenna directivities. For the sake of brevity, the detection of one maximum path will be described below. Nb delay profiles corresponding to the Nb antenna directivities are determined, each of the delay profiles having correlation value information in a delay range from 0 to 2L–1. The correlation peak detector 107 determines a maximum value from Nb×2L correlation values, and determines an antenna directivity index k (k=1–Nb) and a delay l (l=0–2L) at the time. For detecting a plurality of paths, a plurality of peaks may be detected in a similar manner. Of course, it is necessary to preclude base regions of already detected peaks (paths) from peaks to be detected.

If it is assumed that a W-CDMA system is employed, a chip rate=4 MHz, pilot symbols=6 symbols×256 chips=1536 chips, the number Na of antenna element=8, a path search range L=128 chips (reciprocal propagation delay=31 microseconds, radius=about 4.7 km), and the accuracy of calculations of a delay profile=⅛ chip, then the number of calculations per slot is given as follows:

(1) Calculations of delay profiles per antenna element: 1536×128×2=393,216 correlation calculations.

For 8 antenna elements, it is necessary to repeat calculations that are 8 times the above calculations for each slot=0.625 ms.

(2) Weighting calculations per beam: 8×128×2=2,048 complex product and sum calculations.

(3) If a 4-tap filter is used to interpolate ½ chip sampling into ⅛ chip sampling: 128×6×4×2=6,144 real number product and sum calculations.

For 4 beams, it is necessary to repeat calculations that are 4 times the above calculations for each slot=0.625 ms. No multiplications are required in the correlation calculations because the replica signal is a code signal having no amplitude.

It follows from the foregoing example that about 13M complex product and sum calculations per second, about 39M real number product and sum calculations, and about 5G correlation calculations per second are necessary. The number of product and sum calculations is much smaller than if antenna weighting calculations are carried out before correlation signals are determined, and can be reduced to a range that can be achieved by a general-purpose DSP.

Using the calculated delay profiles corresponding to the plural antenna directivities, the correlation peak detector 107 detects peaks over the plural antenna directivities, so that it can simultaneously detect an antenna directivity where the reception level (correction value) is maximum and a path delay.

The path search circuit according to the present embodiment can perform a path search in low Eb/Io environments where the direction of a mobile terminal has not been determined and the directivity of the adaptive array antenna has not yet been established.

Furthermore, because the path search circuit according to the present embodiment simultaneously performs a path search and detects the general direction of a mobile terminal, their dependency on each other, i.e., the problem that once one of the path search and the direction detection fails, the other is disabled and will not be recovered autonomously, is reduced. Therefore, if the path search circuit according to the present invention is applied to a base station apparatus using an adaptive array antenna, then the stability of the path search and the antenna directivity control is increased.

The number of complex calculations is prevented from increasing greatly by effecting antenna weighting calculations on received signals after correlation signals are determined.

Once communications can be started, the direction of the mobile terminal can continuously be monitored. Inasmuch as there is a limitation on the speed of travel of the mobile terminal, the probability that the direction in which the received signal arrives suddenly changes greatly is considered to be small. Though the possibility that the direction in which the received signal arrives suddenly changes cannot be ignored if the mobile terminal is located near the base station antenna, any changes in the direction in which the received signal arrives are considered to be small in most cases. Therefore, the amount of calculations may be reduced by reducing combinations of antenna directivities calculated in a path search as compared with the case when the direction of the mobile terminal upon start of communications is unknown.

2nd Embodiment

A path search circuit according to a second embodiment of the present invention will be described below. The path search circuit according to the second embodiment is similar to the path search circuit according to the first embodiment except that it has a weighted-mean-value processor 106a shown in FIG. 4, rather than the weighted-mean-value processor 106. Those parts of the weighted-mean-value processor 106a which are identical to those of the weighted-mean-value processor 106 are denoted by identical reference characters and will not be described in detail below.

Figure 4:
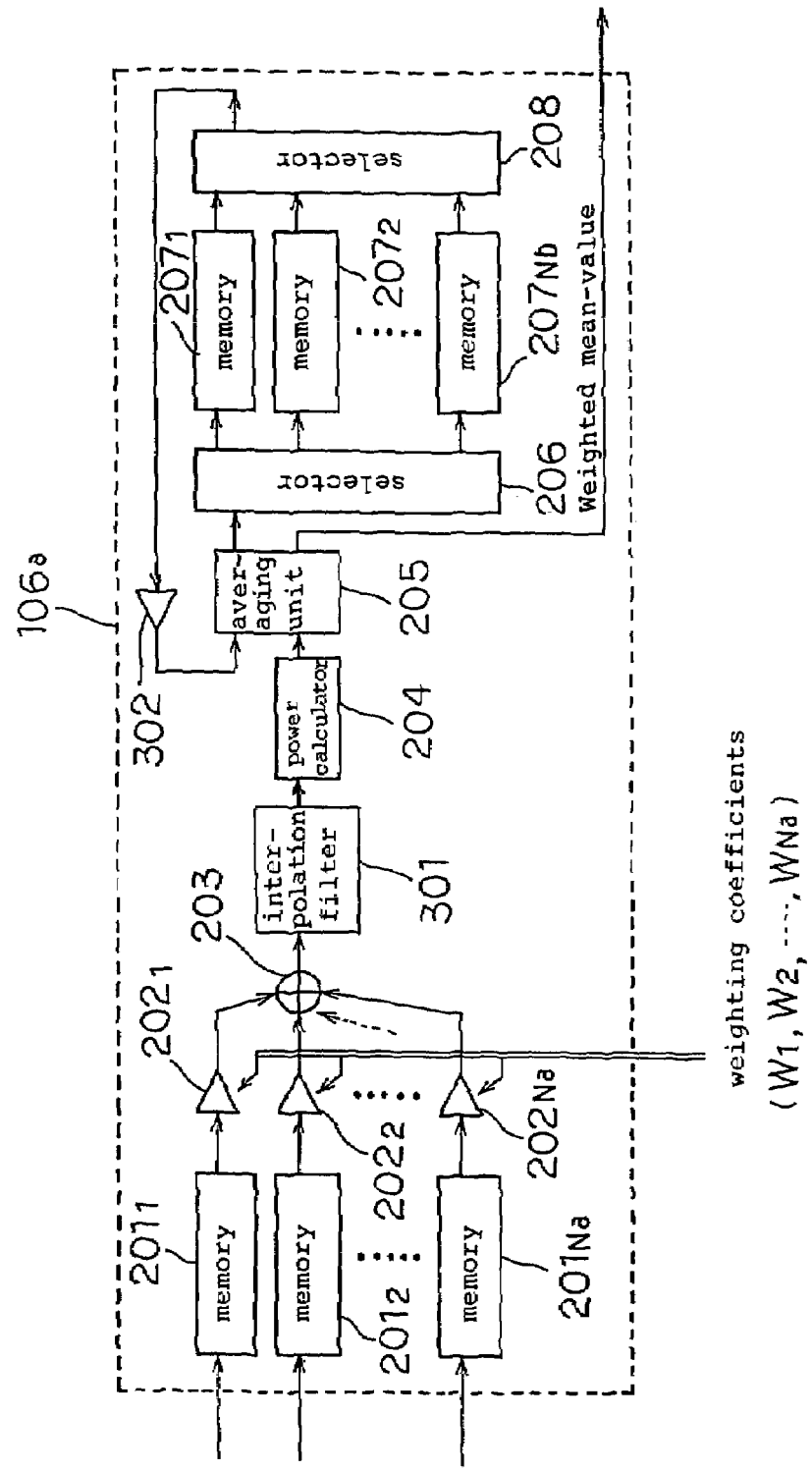
FIG. 4 is a block diagram of a weighted-mean-value processor in a path search circuit according to a second embodiment of the present invention.

The weighted-mean-value processor 106a shown in FIG. 4 differs from the weighted-mean-value processor 106 shown in FIG. 2 in that it has an interpolation filter 301 between the adder 203 and the power calculator 204, and a multiplier 302 between the selector 208 and the averaging unit 205.

The interpolation filter 301 samples again the weighted correlation signal output form the adder 203 at a frequency higher than the sampling frequency of the A/D converters for thereby increasing the sampling rate.

The multiplier 302 multiplies the value output from the selector 208 by a certain value, and then outputs the resultant product signal to the averaging unit 205.

If the delay time accuracy (sampling time) of correlation signals is to be increased using an interpolation filter, then the interpolation filter may be inserted immediately in front of a stage for performing power calculations that are a nonlinear operation.

In the equation (2) shown above, all calculations up to the determination of $XW_k(l)$ are a linear operation. Therefore, if a path delay is to be determined with an accuracy finer than the ½ chip, then it is possible to obtain correlation signals sampled at finer delay timing by interpolating $XW_k(l)$ and passing the interpolated $XW_k(l)$ through a low-pass filter. For interpolating the ½ chip into the ⅛ chip, "0" may be inserted into $XW_k(l)$ and it may be passed through a low-pass filter, as indicated by the equation (3) shown below. For details, reference should be made to Japanese laid-open patent publication No. 10-32523 entitled "Reception timing detecting circuit for CDMA receiver".

If i=0, then $$XW_k(4l+i)'=XW_k(l) \quad (3)$$

If i=1, 2, 3, then $$XW_k(4l+i)'=0$$

The path search circuit according to the present embodiment serves to increase the accuracy of a delay time by passing weighted correlation signals through the interpolation filter 301. Conversely, the path search circuit may be understood as being capable of minimizing the amount of correlation calculations required to achieve a certain accuracy of a delay time. Specifically, irrespective of the accuracy of a delay time, correlation calculations may be effected on a received signal that has been sampled at a rate that is twice the chip rate, and correlation signals sampled again with an arbitrary accuracy can be obtained by passing the correlation signals through the interpolation filter.

The path search circuit according to the present embodiment, which has the interpolation filter, can greatly reduce the amount of calculations for a path search because the accuracy of a delay time (sampling accuracy) required for correlation calculations may be minimum (one half of the chip rate).

The weighted-mean-value processor 106 which comprises the memories and the processing circuit can easily be implemented by a general-purpose digital signal processor (DSP).

In the path search circuits according to the first and second embodiments, as described above, the clearing of the memories which store interim calculated results, the averaging of the correlation power, and the outputting of delay profiles are repeated. However, the correlation power may be averaged according to a moving average method or a method of generating an exponentially weighted mean in time with forgetting coefficients. If the moving average method or the method of generating an exponentially weighted mean is used, then the frequency of the outputting of delay profiles may be smaller than the averaging time interval. Therefore, it is possible to improve, to some extent, a trade-off between the averaging time and the averaging delay time. If the coefficient of the multiplier 302 shown in FIG. 4 is set to a value smaller than 1, then the averaged results in the past can exponentially be forgotten, and an average value that has been exponentially weighted in time can be determined.

In the second embodiment, both the interpolation filter 301 and the multiplier 302 are added to the weighted-mean-value processor 106 according to the first embodiment. However, either one of the interpolation filter 301 and the multiplier 302 may be added to the weighted-mean-value processor 106.

While preferred embodiments of the present invention have been described using specific terms, such description is for illustrative purposes only, and it is to be understood that changes and variations may be made without departing from the spirit or scope of the following claims.

What is claimed is:

1. A path search circuit in a CDMA cellular system, comprising:
    an antenna having a plurality of elements;
    a plurality of radio receivers for frequency-converting radio frequency signals received respectively by the elements of the antenna into respective baseband signals;
    a plurality of A/D converters for converting the respective baseband signals into digital data;
    a plurality of correlation processors for calculating cross correlations between the digital data converted from the baseband signals and a signal known at a reception side, and outputting respective correlation signals;
    a weighted-mean-value processor for weighting and adding the correlation signals output from said correlation processors based on indicated weighting coefficients, storing the weighted and added correlation signals as interim calculated results, and averaging a plurality of interim calculated results stored over a predetermined amount of time;
    a correlation peak detector for detecting at least one peak from the averaged interim calculated results output as delay profiles from said weighted-mean-value processor, and outputting a reception level and reception timing corresponding to the detected peak as a reception level and reception timing of a reception path; and
    a weighting controller for controlling said weighting coefficients to determine a directivity of said antenna and generating a plurality of weighting coefficients to establish a plurality of general antenna directivities for dividing a sector where a mobile terminal with which to communicate is present, when a communication session starts.

2. A path search circuit according to claim 1, wherein said weighted-mean-value processor comprises:
    a first memory for temporarily storing the correlation signals output from said correlation processors;
    as many second memories as the number of antenna directivities to be established, for storing the interim calculated results of the weighted and added correlation signals for the respective antenna directivities; and
    processing means for multiplying the correlation signals read from said first memory by the weighting coefficients indicated by said weighting controller, adding the multiplied correlation signals into a sum signal, determining the power of the sum signal, updating the interim calculated results stored in said second memories based on the determined power, averaging the updated interim calculated results for a predetermined number of times to obtain weighted means of correlation values, and outputting the obtained weighted means as delay profiles.

3. A path search circuit according to claim 2, wherein said weighted-mean-value processor further comprises an interpolation filter for sampling again the weighted correlation signals at a frequency higher than a sampling frequency of said A/D converters to increase a sampling rate.

4. A path search circuit according to claim 1, wherein said weighting controller comprises means for generating combinations of weighting coefficients for establishing an antenna directivity in a plurality of directions in which a party to communicate with is possibly present, when the communication session starts, and reducing the number of combinations to be generated during the communication session so as to be smaller than the number of combinations to be generated when the communication session starts.

5. A path search circuit according to claim 2, wherein said weighting controller comprises means for establishing an antenna directivity in a plurality of directions in which a party to communicate with is possibly present, when the communication session starts, and reducing the number of combinations to be generated during the communication session so as to be smaller than the generating combinations of weighting coefficients for number of combinations to be generated when the communication session starts.

6. A path search circuit according to claim 3, wherein said weighting controller comprises means for generating combinations of weighting coefficients for establishing an antenna directivity in a plurality of directions in which a party to communicate with is possibly present, when the communication session starts, and reducing the number of combinations to be generated during the communication session so as to be smaller than the number of combinations to be generated when the communication session starts.

7. A path search circuit according to claim 1, wherein said weighted-mean-value processor further comprises means for averaging the power of said weighted and added correlation signals according to a moving average method.

8. A path search circuit according to claim 2, wherein said weighted-mean-value processor further comprises means for averaging the power of said sum signal according to a moving average method.

9. A path search circuit according to claim 1, wherein said weighted-mean-value processor further comprises means for averaging the power of said weighted and added correlation signals according to a method of generating an exponentially weighted mean in time with forgetting coefficients.

10. A path search circuit according to claim 2, wherein said weighted-mean-value processor further comprises means for averaging the power of said sum signal according to a method of generating an exponentially weighted mean in time with forgetting coefficients.

11. A path search circuit in a CDMA cellular system, comprising:

an antenna having a plurality of elements;

a plurality of radio receivers for frequency-converting radio frequency signals received respectively by the elements of the antenna into respective baseband signals;

a plurality of A/D converters for converting the respective baseband signals into digital data;

a plurality of correlation processors for calculating cross correlations between the digital data converted from the baseband signals and a signal known at a reception side, and outputting respective correlation signals;

a weighted-mean-value processor for weighting and adding the correlation signals output from said correlation processors based on indicated weighting coefficients, and averaging the weighted and added correlation signals for a predetermined number of times;

a correlation peak detector for detecting at least one peak from the weighted, added and averaged correlation signals output as delay profiles from said weighted-mean-value processor, and outputting a reception level and reception timing corresponding to the detected peak as a reception level and reception timing of a reception path; and a weighting controller for controlling said weighting coefficients to determine a directivity of said antenna and generating a plurality of weighting coefficients to establish a plurality of general antenna directivities for dividing a sector where a mobile terminal with which to communicate is present, wherein said weighting controller comprises means for generating combinations of weighting coefficients for establishing an antenna directivity in a plurality of directions in which a party to communicate with is possibly present, when a communication session starts, and reducing the number of combinations to be generated during the communication session so as to be smaller than the number of combinations to be generated when the communication session starts.

12. A path search circuit according to claim 11, wherein said weighted-mean-value processor comprises:

a first memory for temporarily storing the correlation signals output from said correlation processors;

as many second memories as the number of antenna directivities to be established, for storing interim calculated results of the weighted and added correlation signals for the respective antenna directivities; and processing means for multiplying the correlation signals read from said first memory by the weighting coefficients indicated by said weighting controller, adding the multiplied correlation signals into a sum signal, determining the power of the sum signal, updating the interim calculated results stored in said second memories based on the determined power, averaging the updated interim calculated results for a predetermined number of times to obtain weighted means of correlation values, and outputting the obtained weighted means as delay profiles.

13. A path search circuit according to claim 12, wherein said weighted-mean-value processor further comprises an interpolation filter for sampling again the weighted correlation signals at a frequency higher than a sampling frequency of said A/D converters to increase a sampling rate.

14. A path search circuit according to claim 11, wherein said weighted-mean-value processor further comprises means for averaging the power of said weighted and added correlation signals according to a moving average method.

15. A path search circuit according to claim 12, wherein said weighted-mean-value processor further comprises means for averaging the power of said sum signal according to a moving average method.

16. A path search circuit according to claim 11, wherein said weighted-mean-value processor further comprises means for averaging the power of said weighted and added correlation signals according to a method of generating an exponentially weighted mean in time with forgetting coefficients.

17. A path search circuit according to claim 12, wherein said weighted-mean-value processor further comprises means for averaging the power of said sum signal according to a method of generating an exponentially weighted mean in time with forgetting coefficients.

* * * * *